Patented Nov. 12, 1946

2,410,893

UNITED STATES PATENT OFFICE 2,410,893

ALKYL ETHERS OF VITAMIN D

Nicholas A. Milas, Belmont, Mass., assignor to Research Corporation, New York, N. Y., a corporation of New York No Drawing. Application February 8, 1940, Serial No. 317,967

2 Claims. (Cl. 260—397.2)

The present invention relates to the alkyl ethers of vitamin D. Alkyl ethers of vitamin D have been prepared and found to be physiologically active. They are novel and are essential intermediates in certain methods for the synthesis of the vitamin. The ethers are prepared, in accordance with the present invention, by reacting the metallic vitaminates with alkyl halides or sulfates whereby the metal of the vitaminate is replaced by the alkyl group of the alkyl halide or sulfate yielding the corresponding alkyl ether of the vitamin.

The metal vitaminates readily are prepared by various methods several of which are described in my Patent No. 2,296,291. A single method will be described hereinafter by way of illustration.

The reaction by which the ethers of the vitamins are formed from the vitaminates is illustrated by the following general reaction Equations 1 and 2.

1. 

RO Me+R' hal→ROR'+Me hal in which R represents the hydrocarbon portion of the molecule of vitamin D, Me represents a metal, R' represents an alkyl group and hal stands for a halogen, 2. 

RO Me+R'R" SO₄→ROR'+Me R" SO₄ in which R is the hydrocarbon portion of the molecule of vitamin D, Me stands for a metal and R' and R" are the same or different alkyl groups.

The invention is illustrated by the following specific examples.

*Example 1.—The trityl ether of calciferol (vitamin D₂)*

All reactions in the preparation of this and other ethers of vitamin D are carried out in an atmosphere of pure nitrogen. To about 15 cc. of t-butyl alcohol containing 0.1 g. of metallic potassium was added 0.22 g. of calciferol (vitamin D₂) in 50 cc. of anhydrous ether. The mixture turned yellowish showing a reaction between the two reacting components which led to the production of the potassium salt of vitamin D₂. After 15 minutes of standing at room temperature, the ether and t-butyl alcohol were removed under reduced pressure at a temperature not higher than 50° C. To the yellowish solid residue was added 15 cc. of anhydrous 1.4 dioxane and 0.17 g. of trityl chloride (triphenyl chloromethane). An immediate precipitation of potassium chloride occurred. The mixture was then heated at 40–50° for about 3 hours, and to make sure that the tritylation was complete an additional 0.2 g. of trityl chloride together with 2 cc. of anhydrous pyridine were added and the mixture heated as before for several hours longer.

After the reaction was over the dioxane together with the excess pyridine were removed under reduced pressure and the solid residue extracted several times with ether, the ethereal solution shaken first with 10% acetic acid to remove the pyridine then with dilute sodium bicarbonate solution to remove the excess acetic acid. The ethereal solution was finally dried over anhydrous magnesium sulfate, filtered and the ether removed under reduced pressure. The semi-solid residue which was only slightly soluble in petroleum ether (Note: This solubility property differentiates the trityl ether from calciferol which is quite soluble in petroleum ether) was taken up in ether again. Like calciferol itself, the trityl ether was found to react in pure chloroform solution with antimony trichloride to give a pink coloration having definite absorption bands in the visible region of the spectrum. This spectrum shows a band with a maximum at 5600 Å., another very prominent band with a maximum at 4950 Å., which is in the same region as that exhibited by calciferol itself, and still a third less prominent band with a maximum at 4350 Å. The last mentioned band is a new band which may be due to the presence of the trityl group since the trityl ether of vitamin A also shows this band but it is not found in the spectra of the corresponding methyl ethers of these two vitamins. From the extinction coefficient, (E), of the 4950 Å. band, the potency of the trityl ether has been calculated to be approximately 9,500,000 International units per gram and a biological assay has shown it to be in excess of 4,750,000 but less than 9,500,000 U. S. P. XI units per gram.

*Example 2.—The methyl ether of calciferol (vitamin D₂)*

To about 15 cc. of t-butyl alcohol containing 0.1 g. metallic potassium was added 50 cc. of ether containing 0.22 g. calciferol (vitamin D₂) and the mixture allowed to stand for one hour at room temperature then both the ether and the t-butyl alcohol were removed under reduced pressure at about 40–50°. About 20 cc. of anhydrous ether was then added to the residue the mixture cooled to 0° while 0.1 cc. of dimethyl sulfate was added then warmed to room temperature and kept there for two hours longer. Following this the mixture was evaporated under reduced pressure whereby a white solid remained as the residue which was extracted several times with pure petroleum ether in which the methyl ether was expected to dissolve. The extracts were combined the petroleum ether removed and the viscous residue treated once again with dimethyl sulfate in the same manner as the original calciferol to make sure that complete etherification occurred. After extracting and concentrating as before the resulting viscous liquid was treated with 10 cc. pure methyl alcohol and the mixture warmed to 55° to dissolve the methyl ether as well as any unchanged calciferol. The methyl ether of calciferol separated out as a solid when the methyl alcoholic solution was cooled to 0°. This solid was examined spectroscopically and assayed biologically. The antimony trichloride absorption spectrum of this ether has a prominent band with a maximum at 4990 A. and another less prominent band with a minimum at 4380 A. From the extinction coefficient at 4990 A. the potency of this ether was found to be 16,000,000 International units per gram while a biological assay gave a potency of slightly less than 7,500,000 U. S. P. XI units per gram indicating that this ether is not as easily hydrolyzable in the living tissues as the trityl ether of calciferol.

From the foregoing examples it will be apparent that various alkyl ethers of vitamin D may be prepared by the substitution of the corresponding alkyl groups for the metal of the metal vitaminates. As stated the metal vitaminates may be prepared in a variety of ways.

I claim:

1. As a new product an alkyl ether of vitamin D.

2. As a new product the methyl ether of vitamin D.

NICHOLAS A. MILAS.